(No Model.) 2 Sheets—Sheet 1.

R. T. TORKELSON.
REVOLVER.

No. 339,346. Patented Apr. 6, 1886.

Witnesses;
Henry L. Miller.
Thos. H. Dodge.

Inventor;
Reinhard T. Torkelson (No Model.) 2 Sheets—Sheet 2.
R. T. TORKELSON.
REVOLVER.
No. 339,346. Patented Apr. 6, 1886.
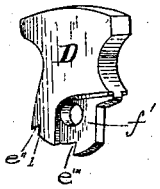
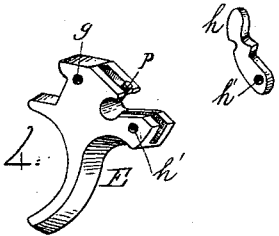
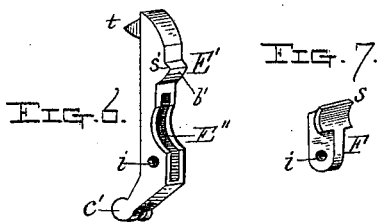
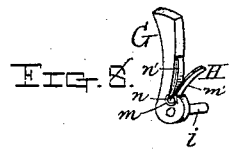
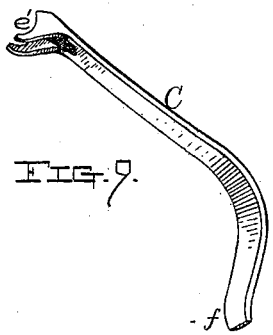
Witnesses; Inventor;

UNITED STATES PATENT OFFICE.

REINHARD T. TORKELSON, OF WORCESTER, MASSACHUSETTS, ASSIGNOR TO IVER JOHNSON, OF SAME PLACE.

REVOLVER.

SPECIFICATION forming part of Letters Patent No. 339,346, dated April 6, 1886.

Application filed October 12, 1885. Serial No. 179,659. (No model.)

*To all whom it may concern:*

Be it known that I, REINHARD T. TORKELSON, of the city and county of Worcester, and Commonwealth of Massachusetts, have invented certain new and useful Improvements in Fire-Arms; and I do hereby declare the following to be a full, clear, and exact description of the same, reference being had to the accompanying drawings, and letters of reference marked thereon, forming a portion of this specification, and in which—

Figure 1:
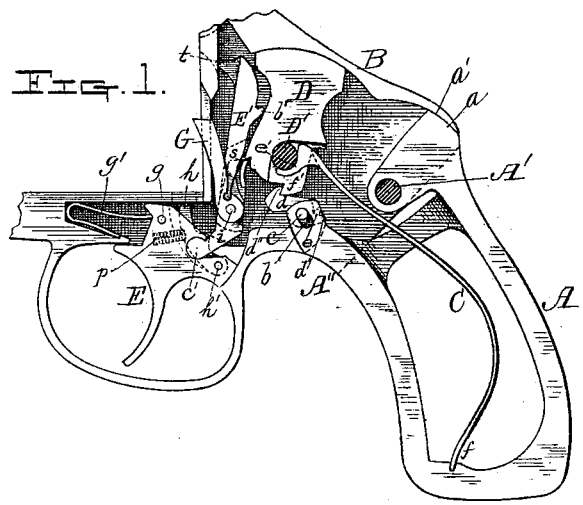
Figure 2:
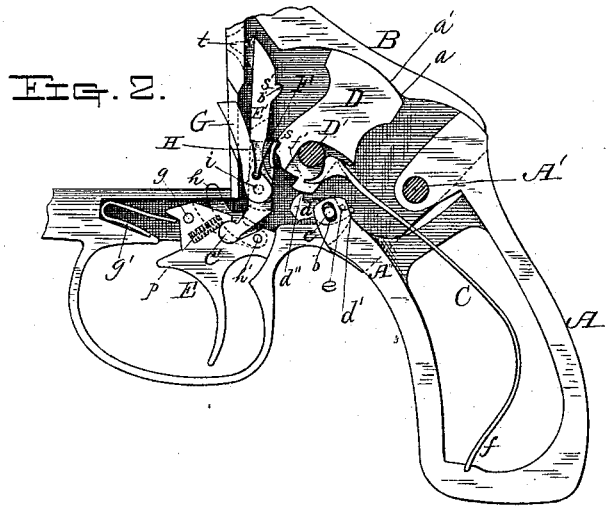

Figure 1 represents a side view of a portion of the rear part of the arm and so much of the frame as is necessary to illustrate my present improvements, a portion being shown in section, as will be hereinafter more fully described. Fig. 2 represents the same parts shown in Fig. 1 as they appear when the arm is just ready to be fired, as will be hereinafter described in detail; and Figs. 3, 4, 5, 6, 7, 8, and 9 represent perspective views of certain parts shown in Figs. 1 and 2 as they appear when detached or disconnected from the arm.

To enable those skilled in the art to which my invention belongs to make and use the same, I will proceed to describe it more in detail.

In the drawings, the part marked A represents the rear part of the arm with the sides thereof removed. This piece A is hinged to the frame portion B of the arm by a pivot or bolt, A', the curved part $a$ being fitted to work against the curved or circular lip portion $a'$ of the breech part B, while the lower portion, A'', is provided with a slot, $b$, which fits over a pin, $c$, said pin being rigidly supported by the part B, and which pin $c$ also supports the safety-catch $d$, which is fitted to turn on pivot or pin $c$, said safety-catch $d$ resting in a slot in the upper end of the lower part, A'', of the part A. The rear end, $d'$, of the safety-catch $d$ extends back under a small pin, $e$, which passes through the slotted end of the part A''. The form of the safety-catch $d$ is shown in the full and dotted lines, Figs. 1 and 2.

The mainspring C is shown detached and in perspective in Fig. 9, and when in position, as shown in Figs. 1 and 2, its lower end, $f$, fits into a slot or notch in the lower part of the handle A, while its upper and larger end extends forward and up and straddles the lower part, $f'$, of the hammer D, curved portions $e'$ of mainspring C fitting against the pivot bolt or pin D'.

Trigger E is pivoted at $g$, and is held in its normal position by means of a spring, $g'$, the construction and arrangement of which is fully shown in Figs. 1 and 2 of the drawings. The rear upper part of trigger E has a curved slot cut through it to receive the rounded lower end, $c'$, of the firing-pin E'. Trigger E has also a vertical slot to receive the hinged cylinder locking-pin $h$, the rear lower end of which locking-pin $h$ is pivoted at $h'$ to the trigger E, so that said locking-pin $h$ is straddled by the lower end of the firing-pin, as fully indicated in dotted and full lines, Figs. 1 and 2 of the drawings.

Firing-pin E' is provided with a vertical slot, E'', in which the sear F is hinged or pivoted, while upon the same pivot $i$, which connects the sear F to firing-pin E', the barrel-revolving lever G is fitted to turn, and said lever G is provided with a curved slot, $m$, in its lower rear side, in which the eye part $n$ of the two-armed spring H rests, one arm, $n'$, and the other arm, $m'$, pressing against the barrel-revolving lever G and the lip of sear F, respectively. The two-armed spring H is prevented from being displaced by eye $n$ being slipped laterally into its socket in the cylinder-revolving lever G. (See Figs. 1, 2, and 8 of the drawings.)

A small spiral spring, $p$, is fitted in a hole in the upper part of the trigger E, to press against the cylinder-locking pin $h$, so that when trigger E is pulled back and firing-pin E' elevated preparatory to the discharge of the arm, spring $p$ forces the upper end of pin $h$ up into a notch in the cylinder, thus holding the cylinder securely in position until after the charge is fired. Position of spring $p$ and its operation are shown in dotted lines, Figs. 1 and 2. (See, also, Fig. 4.)

The firing-pin being hinged to the trigger when at rest, as shown in Fig. 1, is drawn down, so that it is not in position to be forced against the cartridge, even though the hammer were to be forced against it, and this is an important feature of construction, since it prevents accidents.

In Fig. 1 the trigger, hammer, and firing-pin are shown at rest or in the relative positions they occupy when the arm is carried, while in Fig. 2 they are shown in the relative positions they occupy just before the hammer D slips off of the slightly-curved end $s$ of the sear F, to strike against the back $s'$ of the firing-pin E' to drive its point $t$ through the firing-pin hole in the recoil-plate to explode the cartridge. (See full and dotted lines, Figs. 1, 2, and 6.) Small projection 1 on the hammer D serves to throw the point of the raiser or sear F from the notch $e''$ in hammer D at the proper time.

As the point $t$ of the firing-pin is made with an under bevel, while its upper end is beveled off in wedge form toward the hammer, and is also provided with the back projection, $b'$, its point $t$ is kept in the incline or cam groove, which extends down from the firing-pin hole in the recoil-plate (indicated in dotted and full lines in the drawings,) while the firing-pin is being raised or lowered to bring its point opposite the firing-pin hole. The upper outer beveled end of the firing-pin, when the pin is raised, comes in contact with the hammer and also with the bevel in the receiver part B, and is forced forward to keep its point in the groove in the recoil-plate, and when the firing-pin is lowered or drawn down by the trigger its under bevel-point, $t$, comes against the face of cam-groove in the recoil-plate and forces in its descent the back projection, $b'$, on the firing-pin against the hammer, thereby moving the latter back to its normal position.

From the foregoing description it will be seen that when the parts are in position, as shown in Fig. 1, the hammer cannot be operated or forced forward against the firing-pin or the trigger E pulled back until after the rear part, A, of the handle has been turned down and the rear part of safety-catch $d$ forced up, and its point $d''$ withdrawn from the notch $e'''$ in the hammer D, the operation of which parts, as above described, are illustrated by the drawings, Figs. 1 and 2. The action of the mainspring C is such as to retain the handle part A in the position shown in Fig. 1, thereby keeping the safety-catch $d$ locked with the lower end of the hammer, as shown in Fig. 1.

The practical advantages of my improvements will be readily understood by those skilled in the art, and it will be observed that both the hammer and the firing-pin are shielded and protected to such an extent that the arm when loaded may be dropped or thrown upon the floor or ground, and that, too, without liability of firing the same. Consequently accidental firing and accidents in the use of the arm are not liable to occur.

In order to discharge a cartridge, the rear end, A, of the handle must be rotated on its pivot A', and safety-catch $d$ withdrawn from notch $e'''$ in lower end of the hammer and held out of lock until after the trigger has been pulled back and the hammer rotated in firing position, as illustrated by Fig. 2 of the drawings, and while the construction renders it so difficult, if not impossible, to accidentally fire the arm it is nevertheless very convenient to handle and fire the arm when desired, since the hollow of the hand resting upon the outer side or face of the handle part A, with one finger thrown forward and around trigger E, the drawing back of the finger when the hand is in this position first causes the handle part A to swing or turn down, the mainspring yielding for that purpose, after which, as the finger is still further drawn back, the mainspring is compressed or bent and the hammer rotated by the rising of sear F, and as soon as sear F slips from the notch $e''$ in the hammer the latter is thrown forward by mainspring C against the firing-pin E', and the cartridge exploded, after which, the parts being released from the grasp of the hand, resume their normal position, as shown in Fig. 1 of the drawings.

It will be understood that the momentum given to the hammer causes it to fly forward to discharge the cartridge after the mainspring has assumed or regained its position of rest against the hammer-pivot D'. In this instance a projection, $b'$, on the back of the firing-pin causes the hammer to move back sufficiently to be locked with the safety catch or stop $d$ as the firing-pin is drawn down by the return of the trigger to its normal position, as shown in Fig. 1, and the action of all these parts is easy, while they are not liable to get out of order, and they can all be inspected and easily changed or repaired when necessary by simply removing the side of the handle and the side plate.

Only so much of a fire-arm has been shown as is necessary to illustrate the nature of my present invention, all of the other parts of the arm being of any of the well-known forms of construction.

As the handle part A is depressed, the lower edge of slot $b$ in the part A'' comes in contact and rests against pin $c$ after safety catch or stop $d$ has been withdrawn from the notch $e'''$ in the hammer D, thus enabling the arm to be held quite as firmly and steadily as if the handle part A was not hinged.

As the rigid frame or receiver part B holds and supports the firing mechanism, the parts are not liable to be displaced. The cylinder-rotating lever G has a pin, $i$, fixed rigidly therein, and which pin serves to pivot the raiser or sear F, as well as the lever G, to the firing-pin E', the side plate, when in position, keeping lever G and its pin $i$ in place as pin $i$ turns in holes in the slotted firing-pin.

It will be understood that the hinged handle and hammer may be combined together by modified or differently constructed mechanisms without departing from the principle of my invention or the use of non-equivalent mechanical devices.

By my construction and combination of the upper end of the mainspring with the hammer and its pivot-bolt D', the hammer is relieved from the tension of the mainspring when the arm is at rest or the parts in their normal positions, as shown in Fig. 1.

Having described my improvement in firearms, what I claim as new, and desire to secure by Letters Patent, is—

1. In revolving fire-arms, the combination, with the frame or receiver part B, and hinged handle A A', the part A'' being provided with cross-slot $b$, of stationary pin $c$, and safety-catch $d$, arranged in a slot, whereby when the handle A A' is depressed safety-catch $d$ will be operated while it is retained in its proper relative position by pin $e$, substantially as and for the purposes set forth.

2. In revolving fire-arms, the combination, with the frame or receiver part B and hammer D, pivoted therein and provided with notch $e'''$, of hinged handle part A A'', provided with cross-slot $b$, to receive the stop-pin $c$, and longitudinal slot in its end for safety-catch $d$ to work in, and stop-pin $c$, substantially as and for the purposes set forth.

3. In revolving fire-arms, the combination, with the frame or receiver part B, of mainspring C, handle A A'', hinged to the frame, hammer D, pivoted to the receiver part and provided with notch $e'''$, to receive safety-catch $d$, which is fitted to vibrate or travel in a slot in the end of handle part A'', pin $c$ and $e$ for working the connection of safety-catch $d$ with the handle and limiting the motion of the handle, substantially as and for the purposes set forth.

4. In fire-arms, the combination, with hammer D and cylinder-seat or recoil-plate provided with a cam or beveled groove below the firing-pin hole, of trigger E, and firing-pin E', hinged to the trigger and provided with an under beveled point, $t$, a back projection, $b'$, and with its upper end toward the hammer made in wedge form, whereby when the trigger is drawn back in the act of firing the arm, the firing-pin, as it is elevated, will be forced forward by its upper beveled or wedge shaped end coming in contact with the hammer and beveled top, and its firing-point guided into the firing-pin hole, while when the trigger returns to its normal position and the firing-pin depressed to its safety position its under beveled point $t$, pressing against the beveled groove in the recoil-plate, forces projection $b$ against the hammer and moves it back to its normal position, substantially as described.

5. In fire-arms, and in combination with the co-operative lock mechanism, a firing-pin, substantially as described, pivoted at its lower end to the rear upper part of the firing-trigger, combined and operating substantially as and for the purposes set forth.

6. The combination, with hammer D and its pivot D', of mainspring C, and curved fingers or lips $e'$, integral with the head or large end of the spring, and which lips straddle the lower part of the hammer and extend in under the hammer-pivot and rest against it when the mainspring and hammer are in their normal positions, thereby relieving the hammer from the pressure of the mainspring, substantially as described.

REINHARD T. TORKELSON.

Witnesses:
 HENRY L. MILLER,
 THOS. H. DODGE.